United States Patent [19]
Nakaya et al.

[11] Patent Number: 5,125,935
[45] Date of Patent: Jun. 30, 1992

[54] METHOD FOR EFFICIENTLY OBTAINING AN ADSORBABLE GAS FROM A GAS CONTAINING A LOW CONCENTRATION OF THE ADSORBABLY GAS

[75] Inventors: Keiichi Nakaya, Chiba; Masashi Murata, Funabashi; Masaaki Shimizu, Tokyo, all of Japan

[73] Assignee: Asahi Glass Company Ltd., Tokyo, Japan

[21] Appl. No.: 613,702

[22] PCT Filed: Mar. 15, 1990

[86] PCT No.: PCT/JP90/00343
§ 371 Date: Nov. 26, 1990
§ 102(e) Date: Nov. 26, 1990

[87] PCT Pub. No.: WO90/11117
PCT Pub. Date: Oct. 4, 1990

[30] Foreign Application Priority Data

Mar. 24, 1989 [JP] Japan ................ 1-70359
Apr. 5, 1989 [JP] Japan ................ 1-84647

[51] Int. Cl.⁵ .................... B01D 53/04
[52] U.S. Cl. ......................... 55/26; 55/62; 55/68; 55/71; 55/73; 55/74; 55/75
[58] Field of Search ................ 55/25-28, 55/33, 62, 68, 73, 74, 75, 208, 387, 389, 71

[56] References Cited
U.S. PATENT DOCUMENTS

| 3,883,325 | 5/1975 | Führing et al. | 55/25 X |
| 4,104,039 | 8/1978 | Kuri et al. | 55/25 X |
| 4,331,456 | 5/1982 | Schwartz et al. | 55/26 |
| 4,343,629 | 8/1982 | Dinsmore et al. | 55/28 |
| 4,414,003 | 11/1983 | Blaudszun | 55/28 X |
| 4,421,532 | 12/1983 | Sacchetti et al. | 55/26 |
| 4,484,933 | 11/1984 | Cohen | 55/25 |
| 4,536,197 | 8/1985 | Cook | 55/28 |
| 4,842,621 | 6/1989 | Robbins et al. | 55/26 |
| 4,848,985 | 7/1989 | Sadkowski | 55/26 |
| 4,859,216 | 8/1989 | Fritsch | 55/28 |

FOREIGN PATENT DOCUMENTS

| 0018478 | 11/1980 | European Pat. Off. |
| 0046141 | 2/1982 | European Pat. Off. |
| 3630133 | 3/1988 | Fed. Rep. of Germany |
| 3805157 | 4/1989 | Fed. Rep. of Germany | 55/25 |
| 3743681 | 5/1989 | Fed. Rep. of Germany |
| 50-44176 | 4/1975 | Japan |
| 53-53581 | 5/1978 | Japan |
| 673592 | 3/1990 | Switzerland |

Primary Examiner—Robert Spitzer
Attorney, Agent, or Firm—Oblon, Spivak, McClelland, Maier & Neustadt

[57] ABSTRACT

The method of the present invention is one for efficiently obtaining a condensed adsorbable gas from a gas containing a low concentration of the adsorbable gas by subjecting the original gas to the process of adsorption and desorption using adsorption columns packed with an adsorbent and then condensing the exhausted desorbed gas containing a higher concentration of the adsorbable gas, in which the adsorption column after adsorption is subjected to desorption after a desorbed gas exhausted from the second adsorption column to be mentioned later is introduced into the adsorption column to make the adsorbable gas contained in the desorbed gas be adsorbed by the column; an exhaust gas exhausted during the condensation of a desorbed gas and containing the noncondensed adsorbable gas is introduced into the second adsorption column to make the adsorbable gas contained in the exhaust gas be adsorbed by the column; and the desorbed gas containing the adsorbable gas and exhausted during the desorption of the second column which is performed in the next operation of adsorption and desorption is introduced into the adsorption column after adsorption. This method is excellent because of a simple operation, and a small thermal energy required during desorption.

6 Claims, 3 Drawing Sheets ively obtaining an adsorbable gas from a gas containing a low concentration of the adsorbable gas.

METHOD FOR EFFICIENTLY OBTAINING AN ADSORBABLE GAS FROM A GAS CONTAINING A LOW CONCENTRATION OF THE ADSORBABLY GAS

TECHNICAL FIELD

The present invention relates to a method for efficiently obtaining an adsorbable gas from a gas containing a low concentration of the adsorbable gas.

BACKGROUND ART

The known method for obtaining a gas containing a high concentration of an adsorbable gas by subjecting a gas (hereinafter referred to as an original gas) containing a low concentration of the adsorbable gas to adsorption using an adsorbent and then desorbing the adsorbable gas adsorbed by the adsorbent by heating consists of having the adsorbable gas adsorbed by the adsorbent by passing the original gas from one side of a bed packed with the adsorbent to the other side of the bed and then indirectly heating the adsorbent from outside the packed bed, followed by desorbing and recovering the adsorbable gas either by introducing a heated carrier gas in contact with the adsorbent or by introducing a carrier gas having a temperature higher than that of a usual heated carrier gas in contact with the adsorbent.

In the conventional method, the maximum concentration rate which can be achieved by one cycle of adsorption and desorption is only about 10-20 times for a usual temperature of heating. Moreover, since only a small amount of a carrier gas can be used during desorption in order to obtain a recovery gas of high concentration, the gas flow rate in the adsorbent bed becomes low thereby resulting in nonuniform flow and insufficient heating.

SUMMARY OF THE INVENTION

The present invention, which has been achieved in order to eliminate the above disadvantages, provides a method which not only enables a high adsorption efficiency of an adsorbable gas but also enables a recovery gas of high concentration to be obtained even from an original gas of very low concentration by the use of a small thermal energy.

This invention relates to a method for efficiently obtaining a condensed adsorbable gas from an original gas containing a low concentration of the adsorbable gas by subjecting the original gas to the process of adsorption and desorption using adsorption columns packed with an adsorbent and then condensing the exhausted desorbed gas containing a higher concentration of the adsorbable gas, in which the adsorption column after adsorption is subjected to desorption after a desorbed gas exhausted from the second adsorption column to be mentioned later is introduced into the adsorption column to make the adsorbable gas contained in the desorbed gas be adsorbed by the column; an exhaust gas exhausted during the condensation of a desorbed gas and containing the noncondensed adsorbable gas is introduced into the second adsorption column to make the adsorbable gas contained in the exhaust gas be adsorbed by the column; and a desorbed gas containing the adsorbable gas and exhausted during the desorption of the second column which is performed in the next operation of adsorption and desorption is introduced into the adsorption column after adsorption.

The present invention also relates to a method for efficiently obtaining a condensed adsorbable gas from an original gas containing a low concentration of the adsorbable gas by subjecting the original gas to the process of adsorption and desorption using adsorption columns packed with an adsorbent and then condensing the exhausted gas containing a higher concentration of the adsorbable gas, which comprises introducing a gas containing a low concentration of an adsorbable gas into the first and the second columns to make the adsorbable gas contained in the original gas be adsorbed by the columns, repeating the cycle of subjecting the first column to desorption, condensing the resulting desorbed gas according to necessity, making the exhaust gas containing the noncondensed adsorbable gas be adsorbed by the second column and then using the exhaust gas from the second column for the desorption of the above first column (first cycle) and then repeating the cycle of subjecting the second column to desorption, condensing the resulting desorbed gas according to necessity, making the exhaust gas containing the noncondensed adsorbable gas be adsorbed by the first column and then using the exhaust gas from the first column for the desorption of the above second column (second cycle).

According to the present invention, an adsorbable gas can efficiently be obtained from a gas containing a low concentration of the adsorbable gas. Furthermore, the method of the present invention is excellent because it only requires a simple operation, and a small thermal energy during desorption.

BEST MODE FOR PRACTICING THE INVENTION

The present invention will tangibly be described according to FIG. 1 which is a typical flow sheet for practicing the present invention and FIG. 2 which indicates the progress of adsorption and desorption in the following.

Figure 1:
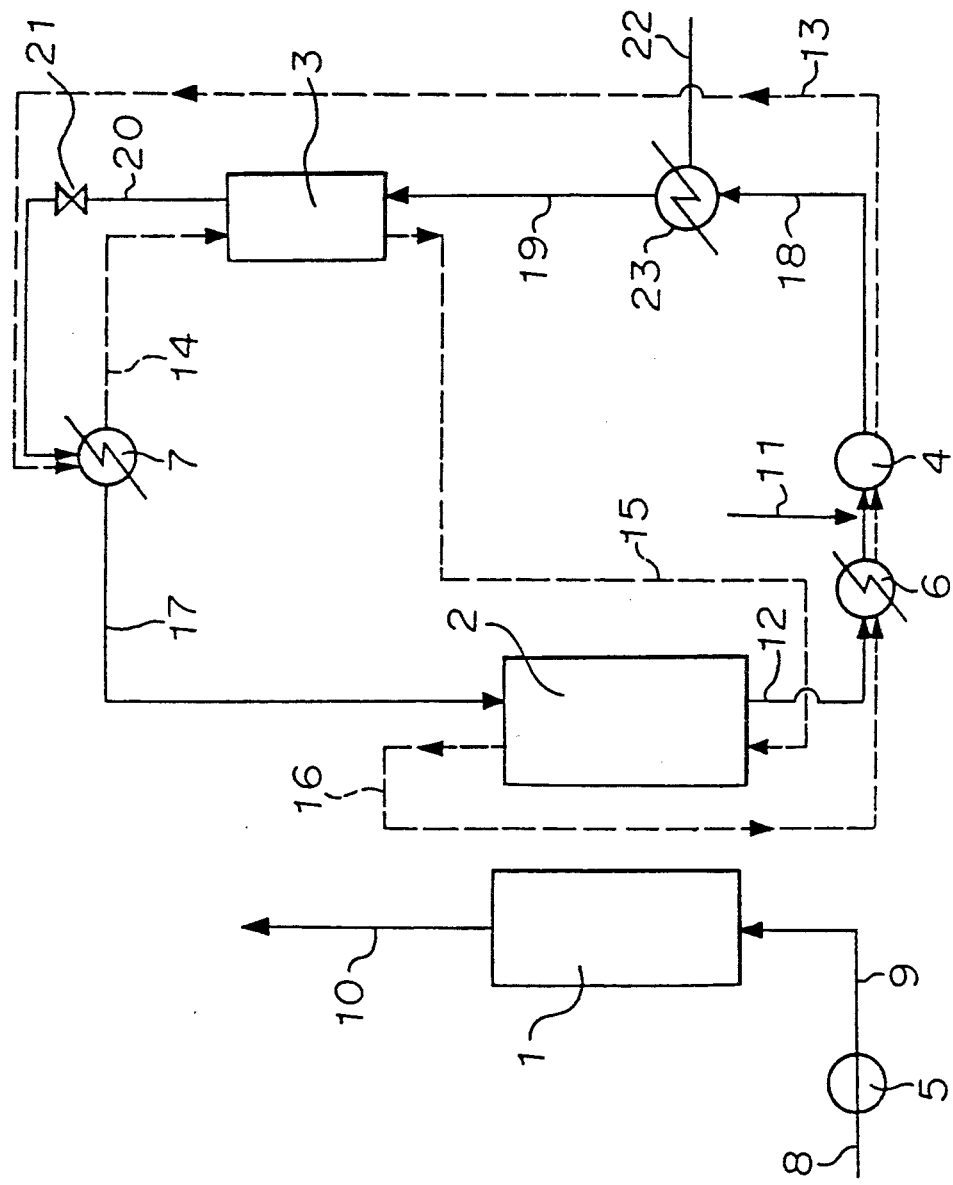
FIGS. 1 and 3 are the diagrams of typical flow sheets for carrying out the present invention and FIG. 2 indicates states of the adsorption of an adsorbable gas by an adsorbent.
Figure 2:
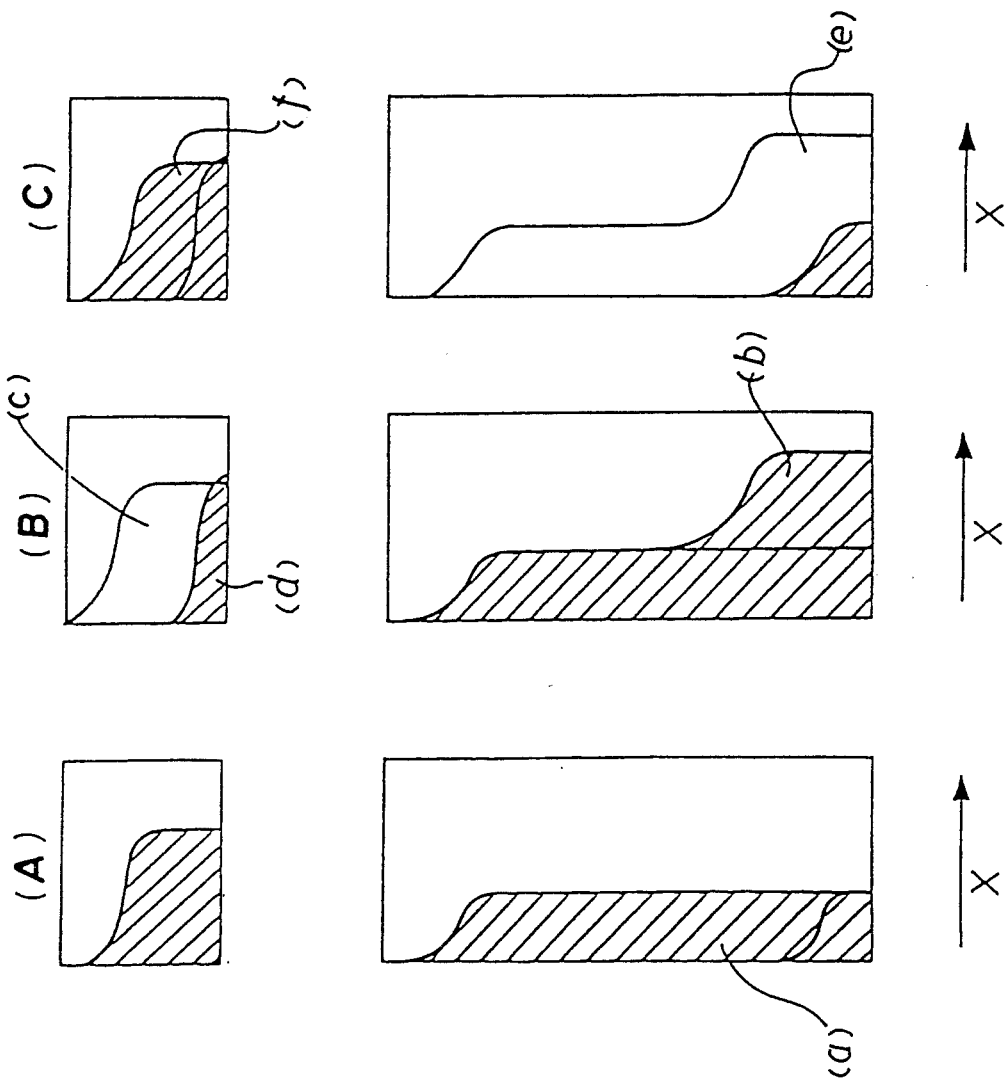

In FIG. 1, symbols 1, 2 and 3 are adsorption columns packed with an adsorbent, the adsorption column 1 is in a state of adsorption and the original gas is fed through a line 8, a blower 5 and a line 9 into the adsorption column 1 where an adsorbable gas is adsorbed and then a gas from the column 1 is exhausted through a line 10. The operation of adsorption is terminated when an approximately predetermined amount of adsorption is achieved but before saturation in the top of the adsorption column. The state of the adsorption of the adsorbable gas by the adsorbent at this point is indicated by a recovery column in FIG. 2(A). In this figure, the horizontal axis (abscissa) represents the concentration (X) of the adsorbable gas in the adsorbent (weight of the adsorbable gas/weight of the adsorbent) and the vertical axis (ordinate) represents the height of a bed packed with the adsorbent. The maximum value of concentration X corresponds to the partial pressure of the adsorbable gas in the original gas. The column 2 in FIG. 1 represent the above column 1 during desorption which has adsorbed the adsorbable gas. As the first stage, a heating carrier gas is introduced from a line 11 through a compressor 4, a line 13, a heater 7 and a line 14 into the second adsorption column 3; the resulting desorbed gas is passed through a line 15 into the adsorption column 2 to recover the adsorbable gas by adsorption; and then the exhaust gas from the column 2 is circulated through a line 16 and the compressor 4. Most of the adsorbable gas in the second adsorption column 3 is desorbed and transferred to the adsorption column 2 by adsorption. This operation increases the adsorbable gas concentration of the adsorbent in the adsorption column to at least the equilibrium concentration of the original gas. The state of the adsorption of the adosorbable gas by the adsorbent at this point is indicated in FIG. 2(B). This figure indicates that part (c) of the second adsorption column 3 was desorbed and transferred to part (b) of the adsorption column 2. The concentration column in FIG. 2 means the second adsorption column 3 in FIG. 1 and the recovery column in FIG. 2 means the adsorption column 2 in FIG. 1.

It is permitted to remove a part of the adsorbable gas in the desorbed gas exhausted from the second adsorption column 3 by condensing the desorbed gas before it is introduced into the adsorption column 2 after adsorption.

Next, in the second stage, the adsorption column 2 is subjected to desorption by feeding a hot blast of a carrier gas into the adsorption column 2 through the heater 7 and a line 17 to form a circulation path consisting of a line 12, a precooler 6, the compressor 4, a line 18, the concentration column 3, a line 20, a valve 21 and the heater 7; the desorbed adsorbable gas from the adsorption column (recovery column) 2 is liquefied in a condenser 23; and the liquefied gas is removed from a line 22. An exhaust gas containing the noncondensed adsorbable gas which has not been liquefied in the condenser is introduced through a line 19 into the second adsorption column 3 to make the adsorbable gas contained in the exhaust gas to be adsorbed by the column 3; and in the next operation of adsorption and desorption, the second adsorption column 3 is subjected to desorption and the desorbed gas containing the adsorbable gas which is exhausted during the desorption is introduced into the adsorption column after the adsorption of the original gas. At this point, valve 21 is preferably controlled in such a manner that the internal pressure of the condenser and the second adsorption column 3 becomes a predetermined pressure level and it is preferable that the internal pressure of the adsorption column 2 be adjusted to atmospheric pressure. These adjustments lead to adsorption of a high adsorbable gas concentration in the second adsorption column 3 under the condition of a partial pressure of the adsorbable gas corresponding to the internal pressure of the condenser. It is of course permitted to locate the valve 21 on the line 19 and to perform adsorption in the column under a pressure unequal to that of the condenser. The heater is turned off and the circulation is stopped at the point when the adsorbable gas in the adsorption column 2 is almost completely desorbed. The distribution of concentrations of the adsorbable gas in the adsorbent is shown in FIG. 2(C). This figure indicates that part (e) of the adsorption column 2 is desorbed and partially liquefied in the condenser and that the nonliquefied part is adsorbed as part (f) of the adsorption column 3. The above operations are repeated.

Next, FIG. 3 which is a typical flow sheet for the method of repeatedly circulating a gas containing a low concentration of an adsorbable gas between at least a pair of adsorption columns will be described.

Firstly, an original gas is introduced into a pair of adsorption-desorption columns T and T' and the gas discharged from the columns T and T' after the adsorption of an adsorbable gas is exhausted through valves 31 and 31'. After the adsorbable gas in the original gas is adsorbed for a predetermined time, the valves 31 and 31' are closed and the gas containing the adsorbable gas is circulated through a path (hereinafter referred to as path T) of the adsorption column T→a valve 33→a compressor 39→a condenser 40 (including coding unit 38)→a valve 34'→the adsorption column T'→a reducing valve 35'→a heater 41→the adsorption column T and a path (hereinafter referred to as path T') of the adsorption column T'→a valve 33'→the compressor 39→the condenser 40→a valve 34→the adsorption column T→a reducing valve 35→a heater 41'→the adsorption column T'.

It is recommended that condensation in the condenser 40 in paths T and T' be performed as necessary when the concentration of the adsorbable gas in the original gas becomes high. A larger amount of the adsorbable gas can be obtained by repeatedly alternating the circulation of path T and the circulation of path T'.

In recovering an adsorbable gas having a low boiling point according to the present invention, it is preferred to condense and recover the adsorbable gas by making the desorbed gas be absorbed by an absorbent and then distilling the resulting liquid prior to condensation.

The absorbents which can be used include fluorine oils such as tetrafluoroethylene-based ones, chlorotrifluoroethylene-based ones perfluorocarbon-based ones, perfluoropolyether-based ones or the like; silicone oils such as dimethyl polysiloxane, diphenyl polysiloxane or the like; fluorosilicone oils; and hydrocarbon oils such as polyolefin-based ones; polyether-based ones, carboxylic ester-based ones, phosphoric ester-based ones or the like. It is also permitted to use a suspension in the above liquid absorbent of a solid adsorbent such as active carbon, a molecular sieve, zeolite, silica gel, alumina or a granular, massive or fibrous complex thereof.

The residual gas not having been adsorbed during adsorption in the present invention is discharged outside the system as it is when it is harmless and after a means of cleaning when it is harmful. The gas adsorbed at a temperature lower than that for desorption or at a pressure higher than that for desorption may be desorbed and recovered by using a heated inactive gas (such as nitrogen gas or air), or by using a reduced pressure produced by a decompression pump, or by the combination of a hot blast and a reduced pressure. When the next operation of desorption is interlocked with the operation of recovery using a hot blast, it is preferred to provide a means of cooling between them in order to increase the adsorption efficiency. For obtaining an adsorbable gas of high concentration, the recovery under a reduced pressure is more effective than the recovery using a hot blast. Although there is no restriction to adsorbent used in the present invention, it is preferable that the adsorbent be selected from the group of active carbon, silica gel, molecular sieves, zeolite and complex thereof. One of various forms of these adsorbents such as granules and fibers can be properly selected. The method of the present invention can be applied not only to recovery of a single gas by heating desorption but also to recovery of specific components in a gas mixture by heating desorption using a selective adsorbent.

In the present invention, a large-scale subsidiary installation such as a boiler is not necessary because desorption can be carried out by a hot blast of a carrier gas or pressure manipulation and because it is not necessary to use steam in desorption, and a water-soluble compound such as alcohol can also be concentrated. In order to remove moisture contaminating the desorbed gas, it is preferred to selectively remove moisture using a material such as a molecular sieve or zeolite having pores which can not adsorb molecules larger than water molecules before an adsorbable gas is liquefied in a condenser preferably after the adsorbable gas has passed through a compressor.

There is no restriction to the adsorbable gas to be recovered according to the present invention as long as it can be adsorbed and desorbed using one of various types of adsorbents, and at least one selected from the group of alcohols, ammonia, hydrogen sulfide, sulfurous acid gas, various hydrocarbons; chlorine compounds such as trichloroethylene, perchloroethylene, methylene chloride and dimethyl chloroform chlorinated fluorine compounds such as trichlorofluoromethane, dichlorodifluoromethane, chlorodifluoromethane, tetrachloro-1,2-difluoroethane, 1,1,2-trichlorotrifluoroethane, 1,2-dichlorotetrafluoroethane and chloropentafluoroethane; and brominated fluorine compounds such as bromotrifluoromethane and 1,2-dibromotetrafluoroethane can be the adsorbable gas to be recovered according to the present invention.

EXAMPLES

EXAMPLE 1

An adsorbable gas was recovered by liquefaction from a gas containing a low concentration of the adsorbable gas by the use of a system shown in FIG. 1.

Firstly, air containing 0.1 vol % of 1,1,2-trichlorotrifluoroethane (hereinafter referred to as R113) gas was passed from the bottom of the adsorption column 1 to its top at about 250 m$^3$/h until the concentration of R113 in the gas at a 20 mm distance down from the top surface of the packed bed becomes 0.005 vol %. R-113 was not detected in the line 10 at this point. The active carbon-R-113 adsorption concentration ratio (weight of R113/weight of active carbon) was about 0.39. Next, the above adsorption column 1 was installed in such a manner that it has the flow of the adsorption column 2 in FIG. 1 and desorption by heating was carried out. As the first stage, the second adsorption column 3 was subjected to desorption by heating the active carbon of the second adsorption column 3 to 130° C. through the line 14 by feeding air from the line 11 through the compressor 4 and the line 13 into the heater 7. The R113 concentration of the resulting desorbed gas was about 9 vol %. The same gas was passed through the line 15 and made to flow from the bottom of the adsorption column 2 to its top and the exhaust gas discharged after the adsorption of R113 was circulated by being fed back to the compressor 4 through the line 16 and the precooler 6. Heating using the heater was stopped at the point when the concentration of R113 in the line 15 became 1 vol % and the circulation was stopped at the point when the temperature of the line 15 became 80° C. As a result, the concentration ratio of R113 in active carbon in the lower part of the adsorption column 2 increased from 0.39 to 0.80. Next, about 15 vol % of the desorbed gas was removed from the adsorption column 2 using the line 12, the precooler 6 and the compressor 3, and the valve 21 was controlled in such a manner that the internal pressure of the condenser 23 and the second adsorption column 3 became about 9 ata. The internal temperature of the condenser was decreased to −20° C. by cooling. The gas not having been condensed in the condenser was passed from the bottom of the second adsorption column 3 to make R113 be adsorbed, and the residual gas was returned to atmospheric pressure by being passed through the line 20 and the valve 21 and was circulated by being fed back to the adsorption column 2 through the heater 7 and the line 17. Heating using the heater was stopped at the point when the concentration of R113 in the line 12 became about 1 vol % and the circulation was stopped at the point when the temperature of the lower part of the adsorption column 2 became 80° C. About 2 kg/h of R113 was obtained from the line 22 when a stationary state was reached after repeated adsorption and desorption.

Comparative Example

Adsorption was carried out by using a column packed with the same active carbon as in Example 1 under the same conditions as in Example 1. The adsorption column 2 was subjected to desorption by the same operation as in Example 1 except that the desorbed gas from the second adsorption column 3 was not used to increase the concentration. As a result, the concentration of R113 in the desorbed gas was only about 1.8 vol % and only about 0.6 kg/h of liquefied R113 was obtained.

EXAMPLE 2

Figure 3:
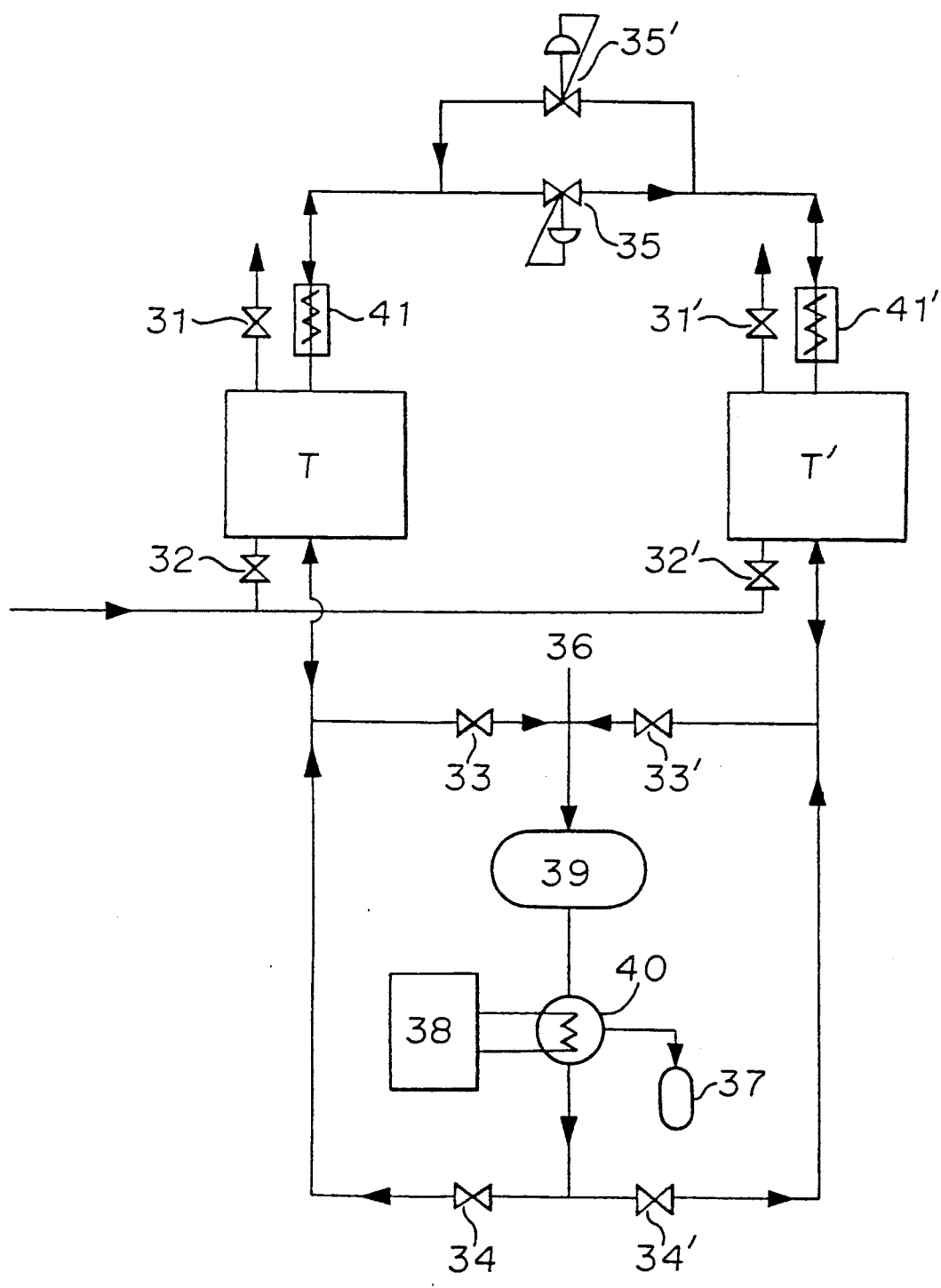

The concentration operation of efficiently obtaining an adsorbable gas from an intermittently generated gas containing a low concentration of the adsorbable gas was carried out using a system shown in FIG. 3.

Air containing about 0.1 vol % of R-113 gas was generated as the original gas at a rate of 300 m$^3$/hr. for seven hours. During the 14 hours between the start of the generation of the original gas and the next start of its generation, the following operation of concentration was carried out. During the time when the original gas was generated, the original gas was fed through the valves 32 and 32' into the lower parts of the adsorption beds of the adsorption columns T and T' each packed with about 35 kg of granular active carbon, and the gas from which R-113 has been removed was exhausted through the valves 31 and 31'.

Next, the valves 31 and 31' were closed and the gas was circulated through a path making a flow of the column T→the valve 33→the compressor 39→the condenser 40→the valve 34'→the column T'→the reducing valve 35'→the heater 41→the column T. Air was made to be sucked from a check valve 36 when a pressure of the indraft inlet of the compressor was reduced so that the pressure of the indraft inlet was maintained at about atmospheric pressure. The flow rate in the compressor was adjusted to 30N m$^3$/h, the discharged pressure was adjusted to 8.5 ata, the temperature of the outlet gas of the condenser was adjusted to −20° C. and the temperature of the outlet of the heater was adjusted to 60° C. At the point when the gas concentration in the outlet of the compressor became 5,000 ppm, valves were controlled in such a manner that a path of the column T'→the valve 33'→the compressor 39→the condenser 40→the valve 34→the column T→the reducing valve 35→the heater 41'→the column T' was formed and these positions of the valves were maintained until the gas concentration in the indraft inlet of the compressor became 5,000 ppm. Following that, the valves were switched in such a manner that the former path was formed. During the time when the above operation was repeated six times, about 17.3 kg of liquid R-113 was recovered in a packet 37. This amount represented about 97% of the amount of R-113 in the original gas.

The time required until the final recovery was about 10 hours.

What is claimed is:

1. A method for efficiently obtaining a condensed adsorbable gas from an original gas containing a low concentration of the adsorbable gas by adsorption and desorption in first and second adsorption columns, comprising the steps of:
    (a) introducing said original gas into a first adsorption column to thereby adsorb the adsorbable gas contained therein,
    (b) introducing a desorbed gas from a second adsorption column into said first adsorption column to thereby adsorb the adsorbable gas contained therein,
    (c) desorbing said adsorbable gas in step (a) and (b) adsorbed in said first adsorption column with the effluent gas from the second adsorption column, said effluent gas from the second adsorption column being introduced into said first adsorption column countercurrent to the flow of said first adsorption column in step (a) and (b),
    (d) said effluent gas in step (c) being obtained by introducing the effluent gas from the first adsorption column in step (c) into a condenser and condensing it, the non-condensed gas then being introduced into said second adsorption column so as to obtain said effluent gas.

2. A method for efficiently obtaining a condensed adsorbable gas from an original gas containing a low concentration of the adsorbable gas by adsorption and desorption in first and second adsorption columns, comprising the steps of:
    (a) introducing said original gas containing a low concentration of adsorbable gas into said first and second adsorption columns to adsorb therein the adsorbable gas contained in said original gas,
    (b) desorbing the adsorbable gas in said first adsorption column with the effluent gas form the second adsorption column, said effluent gas from the second adsorption column being introduced into said first adsorption column countercurrent to the flow of said original gas introduced into said first adsorption column in step (a),
    (c) said effluent gas in step (b) from the second adsorption column being obtained by introducing the effluent gas from the firs adsorption column in step (b) into a condenser and condensing it, the non-condensed gas then being introduced into said second adsorption column so as to obtain said effluent gas in step (b),
    (d) repeating step (b),
    (e) desorbing the adsorbable gas in said second adsorption column with the effluent gas from the first adsorption column,
    said effluent gas from the first adsorption column being introduced countercurrent to the flow of said original gas introduced into said second adsorption column in step (a),
    (f) said effluent gas in step (e) from the firs adsorption column being obtained by introducing the effluent gas from the second adsorption column in step (e) into a condenser and condensing it, non-condensed gas then being introduced into said first adsorption column so as to obtain sad effluent gas in step (e), and
    (g) repeating step (e).

3. A method as set forth in claim 2, wherein steps (b) and (e) are alternately repeated.

4. A method as set forth in claim 1 or 2, wherein before the condensation of the desorbed gas, the desorbed gas is absorbed by a liquid absorbent and then the absorbing liquid is distilled.

5. A method as set forth in claim 1 or 2, wherein the adsorbable gas is at least one selected from the group of alcohols, ammonia, hydrogen sulfide, sulfurous acid gas, hydrocarbons, chlorine compounds, chlorinated fluorine compounds and brominated fluorine compounds.

6. A method as set forth in claim 1 or 2, wherein the adsorbent is active carbon, silica gel, a molecular sieve, zeolite or a composite thereof.

* * * * *

UNITED STATES PATENT AND TRADEMARK OFFICE
CERTIFICATE OF CORRECTION

PATENT NO. : 5,125,935

DATED : June 30, 1992

INVENTOR(S) : Keiichi Nakaya et al.

It is certified that error appears in the above-identified patent and that said Letters Patent is hereby corrected as shown below:

On the title page: Item [54] and Column 1, line 1, should be, --METHOD FOR EFFICIENTLY OBTAINING AN ADSORBABLE GAS FROM A GAS CONTAINING A LOW CONCENTRATION OF THE ADSORBABLE GAS--.

Signed and Sealed this

Fourteenth Day of September, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,125,935
DATED : JUNE 30, 1992
INVENTOR(S) : KEIICHI NAKAYA ET AL

It is certified that error appears in the above-indentified patent and that said Letters Patent is hereby corrected as shown below:

Column 2, line 67, delete "represent", insert --represents--.

Column 4, line 12, delete "coding", insert --cooling--;
        line 34, after "ones", insert --,--.

Column 5, line 23, after "chloroform", insert --,--.

Column 8, line 2, delete "form", insert --from--;
        line 10, delete "firs", insert --first--;
        line 23, delete "firs", insert --first--.

Signed and Sealed this

Fourteenth Day of December, 1993

Attest:

BRUCE LEHMAN

*Attesting Officer*      *Commissioner of Patents and Trademarks*